(No Model.) 3 Sheets—Sheet 3.
A. C. HENDRICKS.
FERTILIZING GRAIN DRILL.
No. 272,547. Patented Feb. 20, 1883.
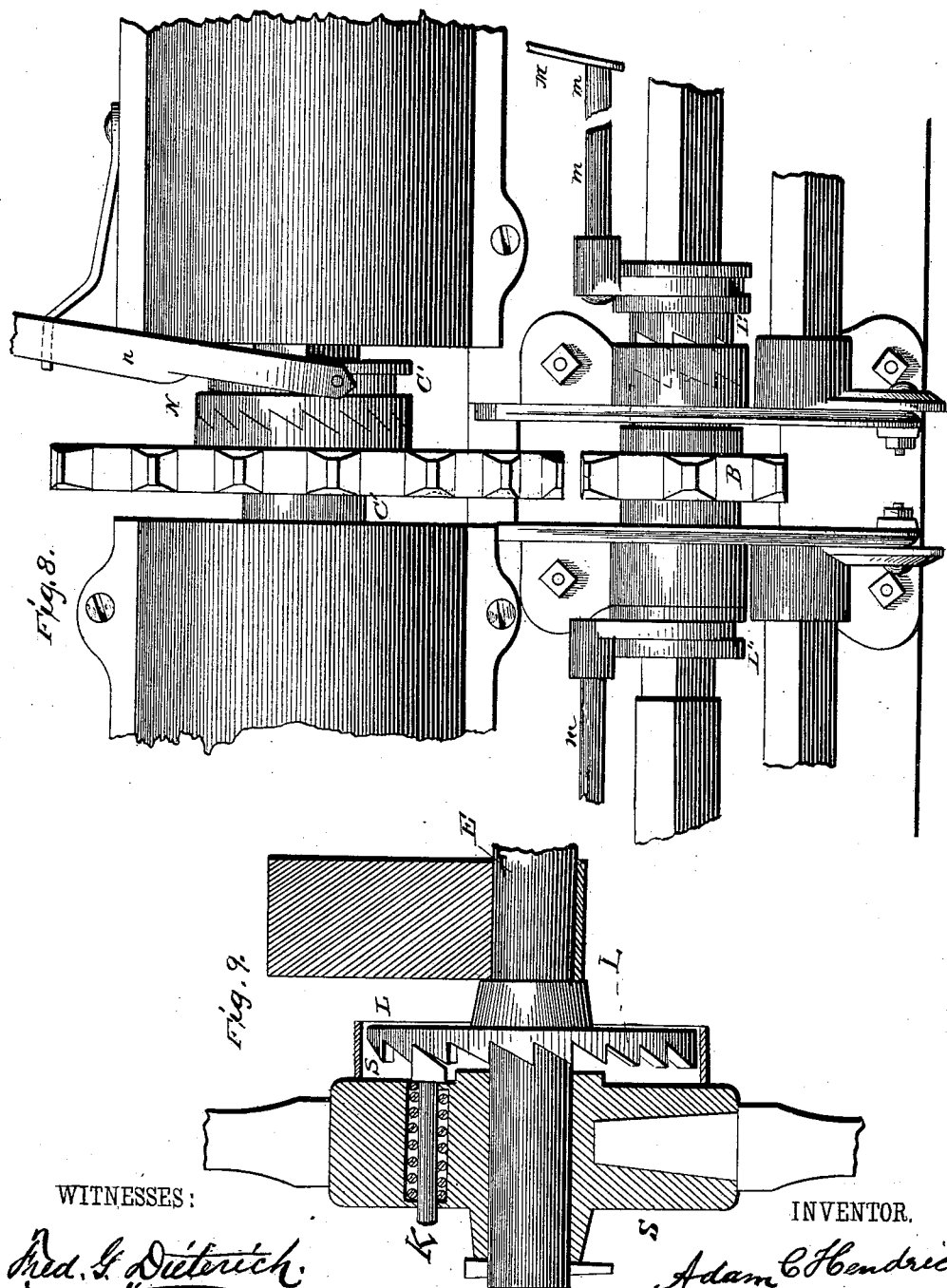
WITNESSES:
Fred. G. Dieterich.
Jno. H. Stockett.
INVENTOR.
Adam C. Hendricks
By Daniel Breed ATTORNEY.

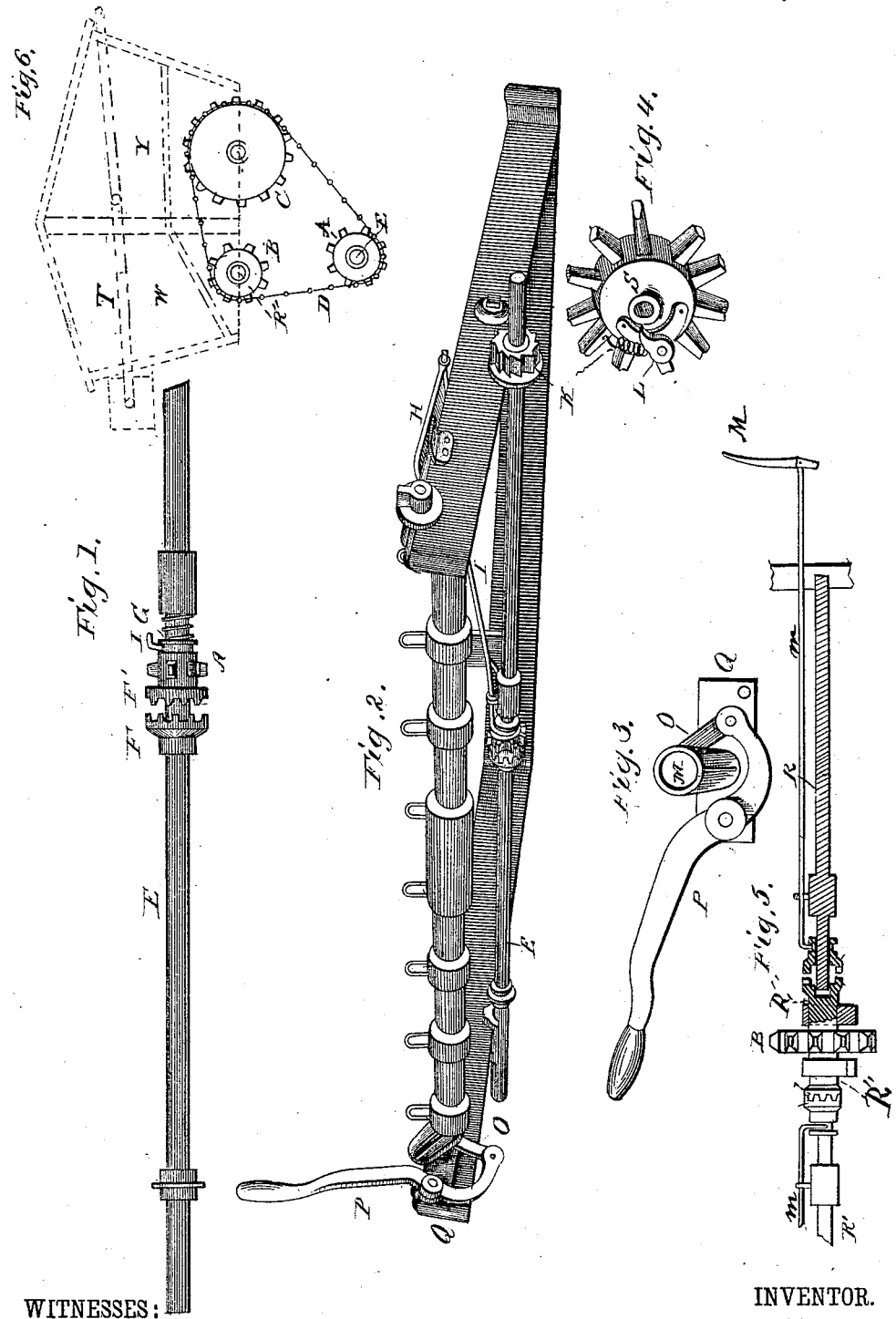

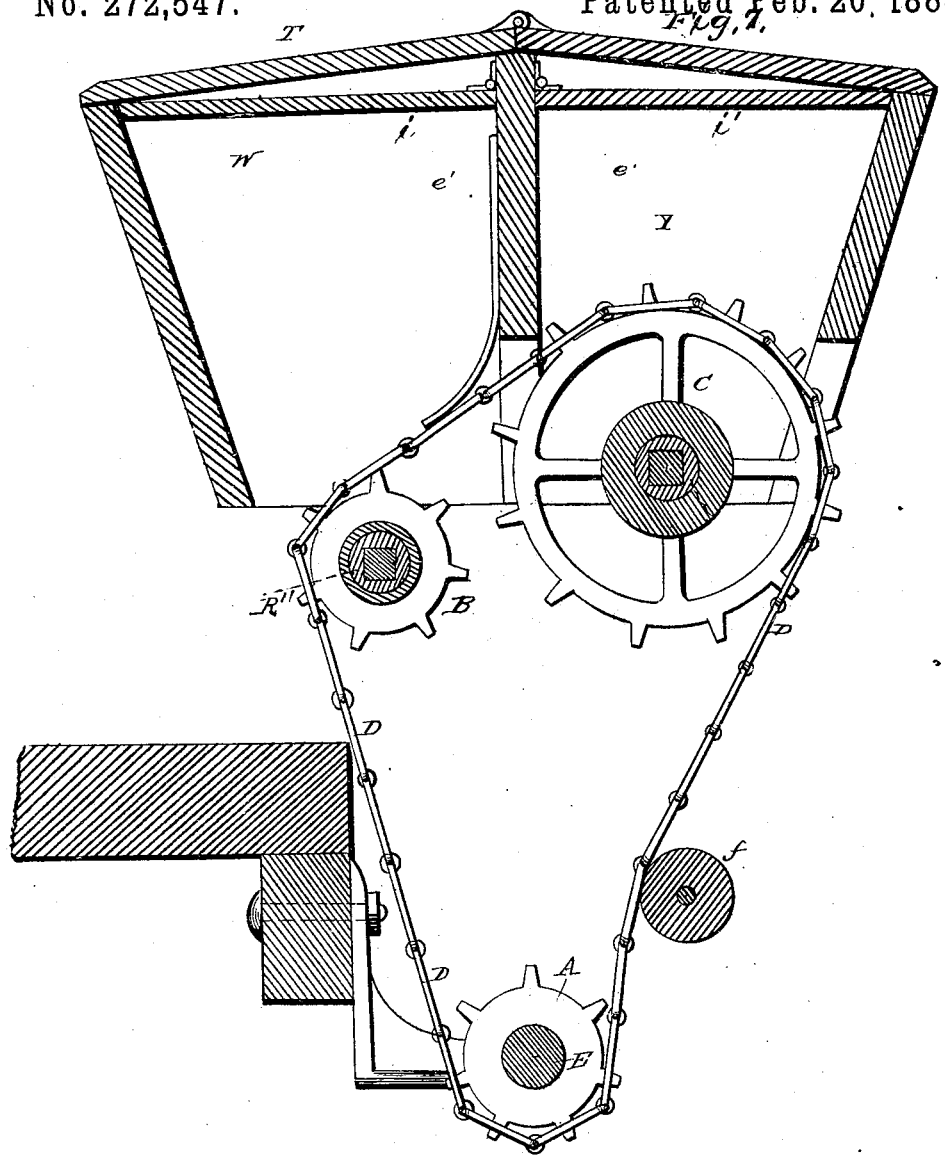

UNITED STATES PATENT OFFICE.

ADAM C. HENDRICKS, OF DUFFIELD'S, ASSIGNOR OF ONE-HALF TO HENRY ST. JOHN SHEPHERD, OF SHEPHERDSTOWN, WEST VIRGINIA.

FERTILIZING GRAIN-DRILL.

SPECIFICATION forming part of Letters Patent No. 272,547, dated February 20, 1883.

Application filed September 19, 1882. (No model.)

*To all whom it may concern:*

Be it known that I, ADAM C. HENDRICKS, of Duffield's, in the county of Jefferson and State of West Virginia, have invented certain new and useful Improvements in Fertilizing Grain-Drills; and I do hereby declare that the following is a full, clear, and exact description of the invention, which will enable others skilled in the art to which it appertains to make and use the same, reference being had to the accompanying drawings, which form a part of this specification.

My invention consists of certain improvements in grain-drills, the chief feature of which is the arrangement of three sprocket-wheels with chain thereon for operating either or both divisions of the grain-shaft, and also either or both divisions of the fertilizer-shaft from the axle of the traveling wheels.

In the drawings, Figure 1 is a detached view of the axle of the traveling-wheels with sprocket-wheel and clutch thereon. Fig. 2 represents the rock-shaft and crank-lever for elevating the boots, and also the axle of the traveling wheels and part of the frame. Fig. 3 is an end view of rock-shaft and lever, Fig. 2. Fig. 4 represents a ratchet and pawl or clutch connected with the hub of the traveling wheel. Fig. 5 represents the divided grain-shaft and its connection with other devices. Figs. 6 and 7 are sectional views representing the three sprocket-wheels, one on the axle of the traveling wheels, another connected with the grain-shaft, and the third connected with the fertilizer-shaft, all gearing with the chain, by which motion is transmitted. Fig. 8 is a bottom view of the central portion of the machine herein described. Fig. 9 represents a modification of the clutch shown in Fig. 4.

My improvements may be applied to a fertilizing grain-drill of the ordinary construction, which need not be described. The hopper has a grain-division, W, and a fertilizer-division, Y, as seen in Figs. 6 and 7. Across the middle of the hopper is made a box with hinged covers $i$ $i'$, Fig. 7, to receive the sprocket-wheels B and C with chain D thereon, and also to exclude dust and allow access to the central gearing for the purpose of oiling the same. The sprocket-wheel A is attached to the axle E of the traveling wheels, and by means of chain D transmits motion to the sprocket-wheel B upon a short central hub or shaft, R'', of the grain-shaft and also to the sprocket-wheel C of the central hub of the fertilizer-shaft. This chain is provided with an idler, $f$, Fig. 7, in the usual way. Between the two divisions R and R' of the grain-shaft is a short hub or shaft, R'', Fig. 5, with a clutch on each end arranged to be thrown into gear or out of gear with the two divisions R and R' of the grain-shaft by means of the clutch-rod $m$ and lever M, Figs. 5 and 8. In the same manner the two divisions of the fertilizer-shaft are arranged to be thrown into gear or out of gear, so that either division thereof or both divisions of said shaft may be set in motion or stopped at pleasure. Each hub S of the traveling wheels is also provided with a clutch, L, and spring-pawl K, Fig. 9, so that said axle may be thrown out of gear with said wheels, and thus stop the motion of chain D at pleasure.

Having described my machine, what I claim is—

1. The described combination of three sprocket-wheels A B C and chain D, with devices for operating the divided grain-shaft and divided fertilizer-shaft from the undivided axle of the traveling wheels, substantially as set forth.

2. The combination, in a grain-drill hopper divided transversely, of a hinged covered box centrally located therein, extending from side to side and from top to bottom thereof, in which are journaled the sprocket-wheels mounted on their respective shafts, whereby they are kept free from foreign substances and access is had for the application of lubricants, as described and shown.

In testimony that I claim the foregoing as my own I have hereto affixed my signature in presence of two witnesses.

ADAM C. HENDRICKS.

Witnesses:
SAML. B. SIGLER,
LEWIS M. RONEMOUS.